Sept. 12, 1950     E. L. LONGAKER     2,521,924
STORAGE BATTERY
Filed Sept. 5, 1945     2 Sheets-Sheet 1
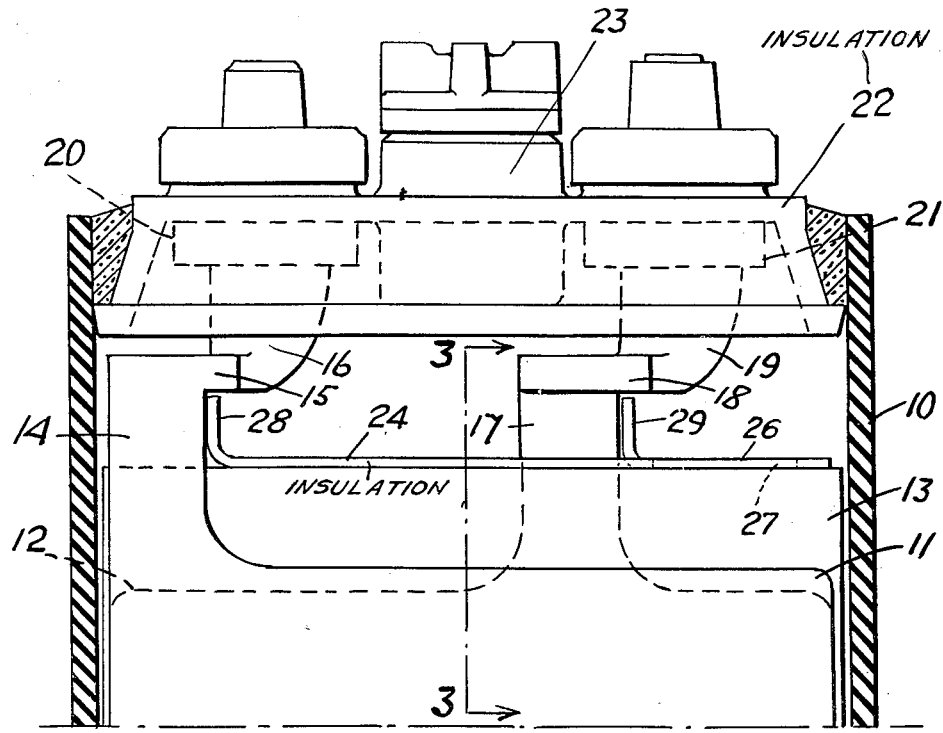
FIG.1.
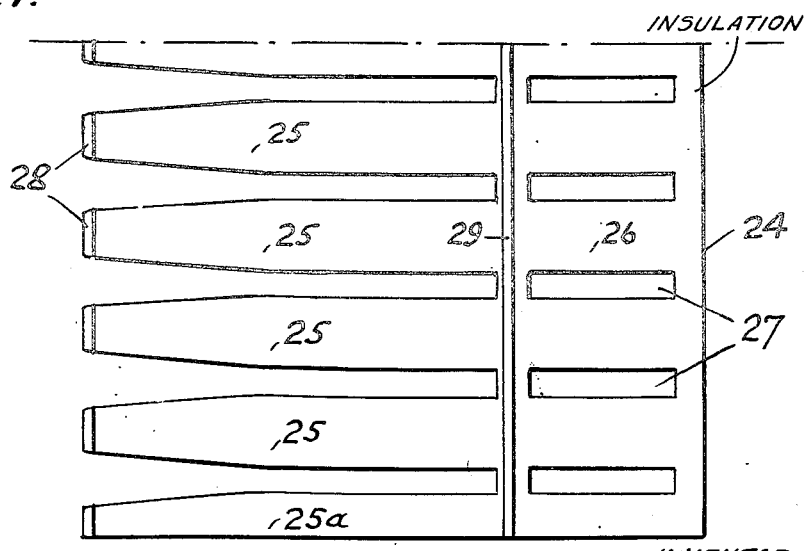
FIG.2.    Edgar L. Longaker
INVENTOR
BY Augustus B. Stoughton.
ATTORNEY
WITNESS:

Sept. 12, 1950　　　E. L. LONGAKER　　　2,521,924
STORAGE BATTERY

Filed Sept. 5, 1945　　　　　　　　　　　　2 Sheets-Sheet 2

WITNESS:　　　　　　　　　　　　　　　　INVENTOR
Rob R Mitchel　　　　　　　　　　　Edgar L. Longaker
　　　　　　　　　　　　　　　　　　　　BY
　　　　　　　　　　　　　　　　Augustus B. Stoughton.
　　　　　　　　　　　　　　　　　　　ATTORNEY.

Patented Sept. 12, 1950

2,521,924

UNITED STATES PATENT OFFICE 2,521,924

STORAGE BATTERY

Edgar Layton Longaker, Collegeville, Pa., assignor to The Electric Storage Battery Company, a corporation of New Jersey Application September 5, 1945, Serial No. 614,481

8 Claims. (Cl. 136—134)

1

This invention relates to storage batteries and more particularly to the design of a protective shield overlaying the tops of the plates and separators of a storage battery element assembled in a suitable container.

It is recognized that one cause of deterioration in the performance of a storage battery is the building up on the upper edges of the negative plates of a mass of sediment reduced to metallic lead by the charging current, which mass may eventually bridge over the tops of the adjacent separators and come in contact with the positive plates to produce a short-circuit.

An object of this invention is the provision of a protective shield overlaying the tops of the plates and separators of a storage battery element which will prevent the formation of a conductive path between the upper edges of adjacent positive and negative plates by the deposition of sediment and its reduction to metallic lead.

A further object of this invention is to provide such a protective shield in the form of a comb of insulating material which may be inserted in place after the element comprising positive and negative plates and interposed separators has been completely assembled.

Another object of this invention is to provide such a protective shield with upstanding projecting ribs abutting against the under surface of the group-connecting straps to prevent upward displacement of the shield and enable it to function as a separator hold-down.

Another object of this invention is to provide such a protective shield in one piece, adapted to function as above described, which may be inexpensively fabricated and assembled.

Another object of the invention is so to locate the upstanding conducting lugs of the positive and negative plates, as to provide for positioning the protective shield so as completely to cover the exposed upper edges of the negative plates.

This invention will be more clearly understood by reference to the following description in connection with the accompanying drawings in which:

Fig. 1 is a side elevation, partly in section, of the upper part of a storage battery cell embodying features of the invention;

Fig. 2 is a plan view of the protective shield shown in Fig. 1;

Figure 4:
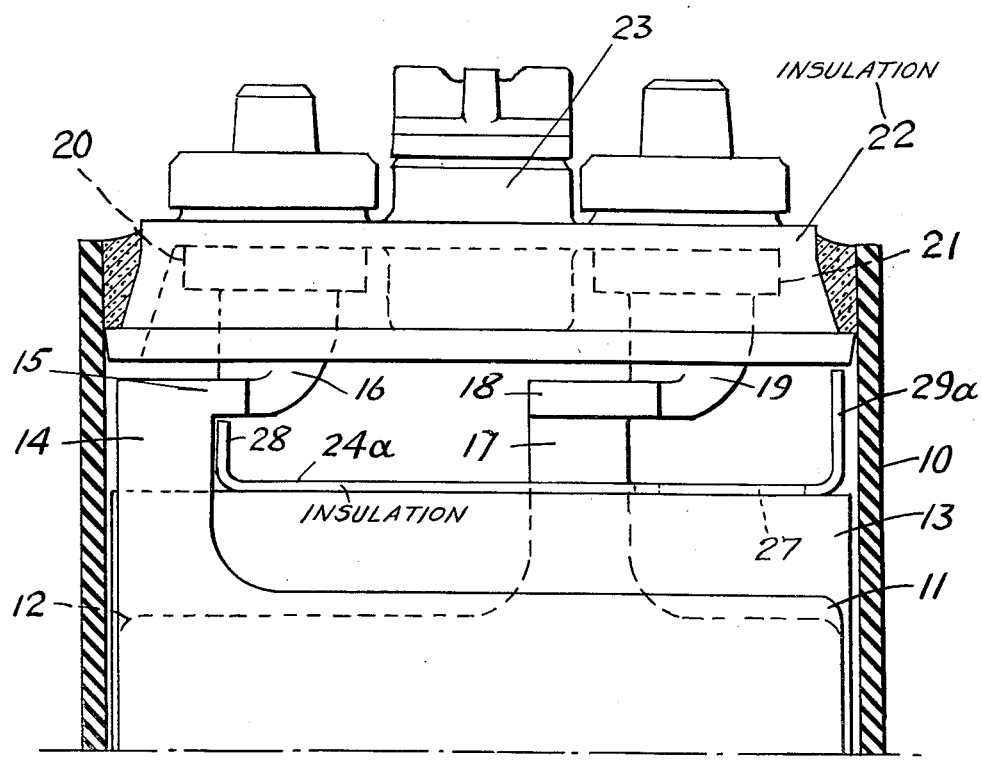
Fig. 4 is a side elevation similar to Fig. 1 showing a modification.

In the drawings, 10 represents the walls of a storage battery container in which is assembled the usual element comprising negative plates 11,

2 positive plates 12 and interposed separators 13. The negative plates are provided with conducting lugs 14 lead-burned to connecting straps 15 having an upstanding terminal post 16. Similarly, the positive plates have conducting lugs 17 lead-burned to connecting strap 18 with its terminal post 19. The terminal posts 16 and 19 are provided with integral collars 20 and 21, respectively, which support the cell cover 22 of standard design in the usual manner. The cover is provided with the usual filling vent 23. Resting on top of the separators is shown the protective shield of this invention designated by the numeral 24 in Fig. 1 and 24a in Fig. 4.

In Fig. 2 is shown a plan view of the protective shield of Fig. 1 consisting of a comb-like structure having intermediate teeth 25 and outer teeth 25a of half width, the teeth being attached to a back portion 26. The back portion, as here shown, is provided with a series of elongated slots 27 to facilitate circulation of electrolyte and the escape of gas bubbles, but these slots may not in all cases be necessary. The free ends of the teeth 25 are turned up as shown at 28 in Fig. 1 to abut against or closely approximate the under surface of the negative strap 15. Similarly, an upstanding rib 29 (Fig. 1) molded integrally with or affixed in any suitable manner to shield 24 is provided to abut against or closely approximate the under surface of the positive strap 18. These two upstanding projections prevent any appreciable vertical displacement of the shield, causing it to function effectively as a separator hold-down.

Figure 3:
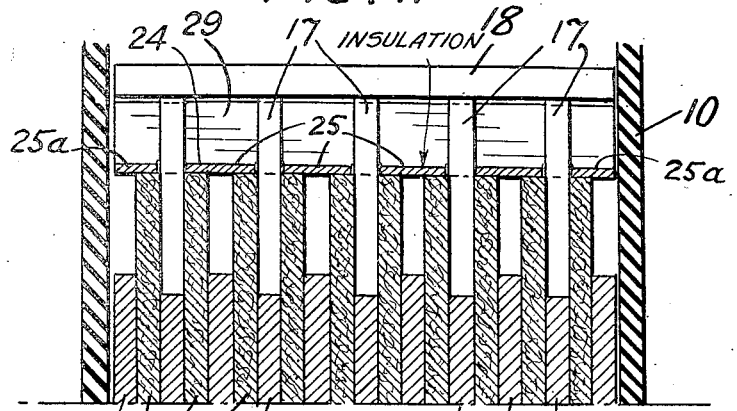
Fig. 3 is a sectional elevation on the line 3—3 of Fig. 1, looking in the direction of the arrows.

It will be noted that, as shown in Fig. 3, each tooth 25 rests on the upper edges of the two separators on opposite sides of a negative plate and, with the corresponding portion of the back comb, completely covers the space over the entire upper edge of the negative plate and the two adjacent separators, thus preventing the deposition of sediment on the upper edge of the negative plate. In the case of the outside negative plates, this space is defined by one separator and the wall of the container. The expression "entire upper edge of the negative plate" as used herein does not include the portion of said plate from which lug 14 projects.

As shown in Fig. 2, the free ends of the teeth 25 are tapered to facilitate insertion between the positive plate lugs of the assembled element. The protective shield is molded or fabricated from some suitable material such as hard rubber, polystyrene or the like.

In Fig. 4, instead of the rib 29 shown in Fig. 1, the back of the comb 24a is turned upward to form the flange 29a which is brought up to the lower edge of the cover 22, thus acting to prevent upward displacement of the shield. Since the cover 22 is supported on the collars 20 and 21, its under surface is located in fixed relationship to the plate groups and thus provides a suitable abutment to prevent upward displacement of the protective shield.

It will be noted that the conducting lug of each negative plate is located at the extreme upper corner of the plate with one vertical edge flush with the corresponding vertical edge of the plate, thus leaving no exposed upper edge of the plate back of the lug not covered by the protective shield. On the other hand, the conducting lugs of the positive plates are offset from the vertical edges to provide space between the lugs and the edges of the plates for the solid back portion of the comb.

From the foregoing, it will be observed that there is provided in accordance with this invention a simple, inexpensive, easily assembled, prefabricated protective shield and hold-down for preventing the formation of a conductive path between the upper edges of adjacent positive and negative plates by the deposition of sediment. While preferred forms of this invention have been described and illustrated, modifications thereof will occur to those skilled in the art and it is intended by the appended claims to cover all such modifications which come within the true spirit and scope of this invention.

I claim:

1. In a storage battery cell comprising groups of positive and negative plates with interposed separators whose upper edges lie in a plane above that of the upper edges of the negative plates, the plates having upstanding conducting lugs and connecting straps uniting the same, the improvement which comprises, a protective shield and separator hold-down in the form of a comb of insulating material having teeth and a back portion, the teeth inserted between the positive plate lugs, each tooth with the corresponding section of the back portion overlaying the entire exposed upper edge of a negative plate and resting on the upper edges of the separators on opposite sides of said negative plate, said comb provided with upstanding projections whose upper surfaces are located in substantial abutment with the under surface of a portion of the cell assembly of fixed position relative to the separators.

2. In a storage battery cell comprising groups of positive and negative plates with interposed separators whose upper edges lie in a plane above that of the upper edges of the negative plates, the plates having upstanding conducting lugs and connecting straps and uniting the same, the improvement which comprises, a protective shield and separator hold-down in the form of a comb of insulating material having teeth and a back portion, the teeth inserted between the positive plate lugs, each tooth with the corresponding section of the back portion overlaying the entire exposed upper edge of a negative plate and resting on the upper edges of the separators on opposite sides of said negative plate, said comb provided with upstanding projections whose upper surfaces are located in substantial abutment with the under surface of said connecting straps.

3. A storage battery assembly comprising, in combination, a case, a cover, intermeshed positive and negative plates and interposed separators projecting above the upper edges of the plates, the negative plates having upstanding conducting lugs flush with the vertical edges of the plates and provided with a conducting strap, the positive plates having upstanding conducting lugs off-set from the vertical edges of the plates and provided with a conducting strap, and a comb of insulating material beneath said cover and said straps and resting on the upper edges of the separators, said comb having a back portion located between the positive plate lugs and the vertical edges of the positive plates and having teeth extending between the positive plate lugs and the negative plate lugs, said back portion and teeth completely overlaying the exposed upper surfaces of the negative plates.

4. A shield for storage batteries for preventing the deposition of sediment on the upper edges of the negative plates comprising a comb of insulating material having teeth and a back portion proportioned and constructed to overlay the entire upper edge of negative plates, and projections upstanding from said teeth and said back portion.

5. A shield as claimed in claim 4 in which said back portion is perforated to facilitate circulation of electrolyte and escape of gases during operation of a storage battery.

6. A protective shield for a storage battery comprising a sheet of insulating material having at one edge spaced teeth provided with outwardly directed upturned portions and having at the back portion slots aligned with the spaces between the teeth.

7. In combination with a storage battery including positive and negative plates having lugs, straps connecting lugs of like polarity and separators interposed between adjacent plates and extending to a height intermediate the upper edges of said plates and the under faces of said straps, a device for protecting said negative plates and holding down said separators, said device including a shield resting on the upper edges of said separators and covering the upper edges of said negative plates and having recesses receiving said positive plate lugs, and means upstanding from said shield engaging the under face of said negative strap.

8. In combination with a storage battery including positive and negative plates having lugs, straps connecting lugs of like polarity, and separators extending to a height intermediate the upper edges of said plates and the under faces of said straps, a device for protecting plate edges and holding down said separators, said device including a shield resting on the upper edges of said separators and overlaying at least a substantial portion of the upper edges of certain of said plates, and means upstanding from said shield engaging the under face of one of said straps.

EDGAR LAYTON LONGAKER.

REFERENCES CITED

The following references are of record in the file of this patent:

UNITED STATES PATENTS

| Number | Name | Date |
|---|---|---|
| 364,660 | Meserole | June 14, 1887 |
| 719,937 | Ford | Feb. 3, 1903 |
| 930,727 | Chamberlain | Aug. 10, 1909 |
| 1,094,173 | Skinner | Apr. 21, 1914 |
| 1,313,513 | Bedell | Aug. 19, 1919 |
| 1,675,321 | Ambruster | July 3, 1928 |
| 2,287,802 | Hill | June 30, 1942 |